Aug. 18, 1959  G. L. CUNNINGHAM  2,900,223
TWO LIQUID LAYER SALT CONVERSION PROCESS
Filed Nov. 15, 1954
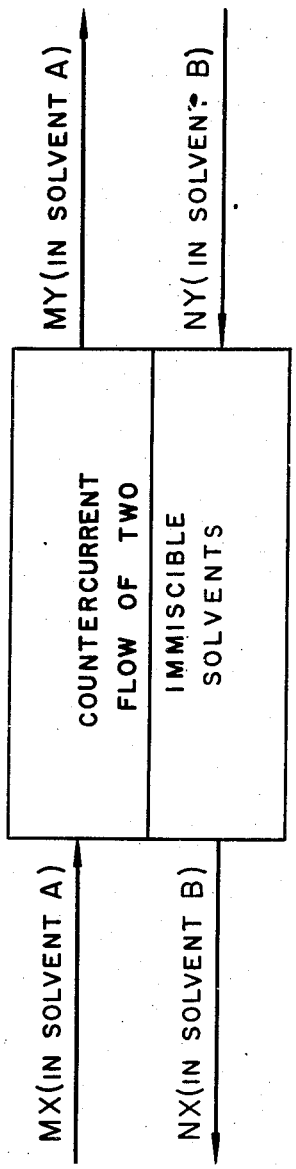
George L. Cunningham
INVENTOR.
BY Neal J. Mosely
his Attorney

2,900,223

TWO LIQUID LAYER SALT CONVERSION PROCESS

George L. Cunningham, Cleveland, Ohio, assignor to Callery Chemical Company, Pittsburgh, Pa., a corporation of Pennsylvania Application November 15, 1954, Serial No. 468,982

4 Claims. (Cl. 23—14)

This invention relates to new and useful improvements in an ionic compound conversion process and more particularly to a process whereby one ionic compound is converted into another ionic compound by flowing a solution of said first mentioned ionic compound countercurrently through or in contact with a solution of another ionic compound in a solvent which is substantially immiscible with the first named solution.

In the past processes which have been available for converting one ionic compound into another ionic compound have involved metathetic or exchange reactions in which a pair of ionic compounds are soluble in a single solvent and in which one of the reaction products is separable by means of differential solubility or differential volatility. Metathetic processes of this type have not always proved to be very practical because of the difficulty in finding suitable ionic compounds for metathetic reactions which are soluble in a single solvent and which produce a reaction product which is separable from the reactants.

It is therefore one object of this invention to provide a new and improved ionic compound conversion process in which an ion exchange reaction takes place which is not dependent upon differential solubiltiy or volatility of the reaction products. Another object of this invention is to provide a new and improved conversion process in which a first ionic compound dissolved in one solvent exchanges ions with another ionic compound dissolved in another solvent which is immiscible with said one solvent. Another object is to provide a new and improved conversion process in which an ionic compound solution in one solvent is run countercurrently to another ionic compound solution in another solvent which is immiscible with said one solvent. Other objects will become apparent from time to time throughout the specification and claims as hereinafter related.

This invention comprises a new and improved process of converting one ionic compound into another and will be described more fully hereinafter and the novelty of which will be particularly pointed out and distinctly claimed.

In the accompanying drawings, to be taken as a part of this specification, there is shown a flow diagram illustrating the application of this process to the conversion of two ionic compounds by effecting an exchange of ions between solutions of said ionic compounds in immiscible solvents.

This invention is based upon the discovery that an ionic compound MX (where M is a metal or other cation and X is an anion, including OH−) dissolved in a solvent A may be flowed countercurrently to a solution of an ionic compound NY (where N is a metal or other cation and Y is an anion, including OH−) in solvent B, where solutions A and B are immiscible, to effect an exchange of ions X and Y and thereby producing a solution of ionic compound MY in solvent A and a solution of ionic compound NX in solvent B.

It is well known that when a salt, base, acid, or other chemical compound is soluble in two liquids which are not completely miscible the concentration of said chemical in one layer divided by the concentration of that chemical in the other layer is a constant. I have discovered experimentally that when an ionizible compound is dissolved in two immiscible liquids the distribution and concentration of ions in the two layers which are formed obeys a similar law, i.e. the ionic concentration in one layer divided by the ionic concentration in the other layer is substantially constant.

The foregoing discovery of the distribution of ions between immiscible solvents may be applied as follows: If an ionic compound is dissolved in a solvent and another ionic compound is dissolved in another immiscible solvent and the two solutions which are formed are flowed countercurrently an exchange of ions will take place between the two solutions so that different ionic compounds are produced in the two solutions after passing countercurrently to another another. For example if a solution of potassium thiocyanate (KCNS) in n-butylamine is run countercurrent to an aqueous solution of sodium hydroxide (NaOH), the products removed from opposite ends of the countercurrent reactor will be an aqueous solution of potassium hrydroxide (KOH) and an n-butylamine solution of sodium thiocyanate (NaCNS). If the flow direction is reversed so that the n-butylamine solution of sodium thiocyanate is run countercurrent to the aqueous solution of potassium hydroxide, the resulting solutions will be an n-butylamine solution of potassium thiocyanate and an aqueous solution of sodium hydroxide. It is apparent therefore that this process differs from the classical solubility systems in that it does not depend upon the formation of a solid phase, and more importantly, it can be made to go in either direction. It is well known that in ordinary reciprocal solubility systems which depend upon the formation of at least one solid phase the reaction can go only in one direction.

The liquids used in this general process are chosen so that the desired result (the formation of two immiscible layers) is accomplished. The liquids can be water and/or any non-aqueous solvents provided that they form two liquid layers under the conditions of the process and that the ionic compounds used in the process have an appreciable solubility in said liquid layers. It is obvious that two liquids which are not very soluble in each other will form two liquid layers and hence would be suitable for most ionic compound conversions using this process. However, it is not necessary to use two liquids which are relatively insoluble in each other since the ionic compounds used in the conversion, or the ionic compounds resulting from the conversion may be such as to cause the formation of two separable liquid layers. For example ammonia and water which are miscible in all proportions can be used under certain conditions of concentrations of ionic compound or certain temperatures. If solid sodium hydroxide is added to a concentrated solution of ammonia in water the system will break into two liquid layers, the top layer being mostly ammonia with a small amount of water and containing a very small amount of sodium hydroxide, while the bottom layer is composed mainly of sodium hydroxide dissolved in water plus a small amount of ammonia.

Now if a compound such as potassium borohydride (KBH₄) which is soluble in ammonia is added to this system and the system is agitated in order to attain equilibrium, the top layer which results will be a mixture of sodium and potassium borohydrides dissolved in ammonia while the bottom layer will consist of a mixture of sodium and potassium hydroxide dissolved in water. It is obvious that this process will not be operable unless the two liquid layers have sufficient solubility for the ionic compounds in question.

For the best operation of this two liquid layer process two ionic compounds having a common negative ion but different positive ions should have a reasonable solubility in one layer while the other two ionic compounds having a common negative ion and different positive ions should have a reasonable solubility in the other layer. If the compounds dissolved in each liquid layer have a relatively low solubility in the other layer the efficiency of the process is increased and the purification problem of the resulting compounds is much easier. This process is completely operative although less efficient when the compounds used have an appreciable solubility in both liquid layers. It should also be noted that this process operates equally well if the solubility relation of the positive and negative ions are reversed. In other words two ionic compounds having a common positive ion and different negative ions may be soluble in one liquid layer while two ionic compounds having another positive ion in common and different negative ions may be soluble in the other layer.

Since this process is generally operative for the conversion of ionic compounds where one of said compounds is soluble in a liquid which is insoluble with the solution of the other compound it is not possible to list all of the possible two liquid layer reciprocal solubility systems by which one ionic compound may be converted into another. The following examples are given for the purpose of illustrating the scope of this invention and are not to be construed as limiting the invention to any particular ionic compounds or any particular solvents.

In one experiment a solution of 81 g. of sodium thiocyanate (NaCNS) dissolved in 670 g. n-butylamine was run countercurrent to an aqueous solution consisting of 56.1 g. potassium hydroxide (KOH) dissolved in 62 g. of water. The densities of the upper layer ranged from 0.809 to 0.825 while the lower layer had densities ranging from 1.42 to 1.38. As a result of this difference in densities the two liquid layers separated quickly. The top layer leaving the countercurrent apparatus contained 96.2 g. potassium thiocyanate (KCNS) and 0.46 g. potassium hydroxide (KOH) dissolved in 670 g. solvent, which was mostly n-butylamine. The bottom layer leaving the countercurrent apparatus contained 39.2 g. of sodium hydroxide (NaOH) and 0.6 g. of sodium thiocyanate (NaCNS) dissolved in 60 g. of solvent which was mainly water.

The above example shows the conversion of sodium thiocyanate into potassium thiocyanate by an ion exchange reaction between countercurrently flowing solutions in water and n-butylamine. This process operates equally well if the two liquid layers are sent through the countercurrent apparatus in a reverse direction to that used above. In other words if the solution of sodium hydroxide and water is run countercurrently to a solution of potassium thiocyanate in n-butylamine, the solutions leaving the countercurrent apparatus will consist of a solution of potassium hydroxide in water and sodium thiocyanate in n-butylamine.

The above example illustrates an ionic compound conversion in a two liquid layer system using n-butylamine and water. However there are numerous other liquids which will form two liquid layers with a concentrated alkali metal hydroxide solution in water. Some of these liquids are: morpholine, N,N-dimethylformamide, pyridine, ethylene diamine, tetraethyleneglycol dimethyl ether, ammonia, triethylamine, and many others. Instead of an aqueous solution for carrying out this process it is possible to use an alcoholic solution of the alkali metal hydroxide. For example concentrated alkali metal hydroxide solutions in methanol will form two liquid layers with triethylamine and other organic solvents which may be used to carry out this process.

In another experiment a concentrated aqueous solution of barium bromide (BaBr₂) was run countercurrent to a concentrated solution of sodium borohydride (NaBH₄) in triethylamine. The top layer leaving the countercurrent apparatus consisted of a solution of barium borohydride Ba(BH₄)₂ in triethylamine together with a small amount of sodium borohydride (NaBH₄). The lower layer leaving the countercurrent apparatus consisted of an aqueous solution of sodium bromide (NaBr) containing a small amount of barium bromide (BaBr₂) and triethylamine. A slight precipitation of barium bromide and barium borohydride took place in carrying out this process. As in the case of the first experiment this conversion will operate in the reverse direction upon reversal of flow of the resultant solutions through the countercurrent apparatus. Other solvents which form two liquid layers with a concentrated aqueous solution of barium bromide are: acetonitrile, tetrahydrofuran, methylal, ethylacetate, n-butylalcohol, n-propylalcohol, and many other organic solvents. These solvents can be used for converting other ionic compounds which are soluble in the particular solvent into ionic barium compounds by flowing their solutions countercurrent to the aqueous solution of barium bromide.

In still another experiment a concentrated solution of potassium chloride (KCl) in n-butylamine was flowed countercurrently to a concentrated solution of sodium carbonate (Na₂CO₃) in water. The solutions leaving the countercurrent apparatus consisted of a solution of sodium chloride (NaCl) in n-butylamine and a solution of potassium carbonate (K₂CO₃) in water. As in the other experiments this process can be reversed by merely reversing the countercurrent flow of the reaction products of this process to produce the original reactants.

In still another experiment an aqueous solution of sodium hydroxide (NaOH) was flowed countercurrently to a solution of potassium chloride (KCl) in n-butylamine. The streams leaving the countercurrent apparatus in this experiment consisted of a solution of sodium chloride (NaCl) in n-butylamine and potassium hydroxide (KOH) in water.

From the foregoing explanation and examples it is apparent that the process herein described is a general process for the conversion of one ionic compound into another ionic compound. This process avoids the problems of formation of solid phases which must be filtered and is limited only by the solubility of the reactant compounds in the two liquid layer system which is to be used. This process produces high conversions and products of high purity compared to most metathetic processes. This process can be used to effect conversions which would be impossible in other reciprocal solubility systems. It should also be noted that in certain conversions where a metathetic reaction is preferred this process may be used for reconverting the metathetic by-product to the original compound which may then be used for carrying out further metathetic reactions.

While there have been enumerated herein several specific embodiments of this invention using different ionic compounds and different liquid systems it should be understood that within the scope of the claims appended hereto this invention may be practiced otherwise than as specifically described.

Having thus described my invention what I desire to claim and secure by Letters Patent of the United States is:

1. A method of converting NaCNS into KCNS which comprises contacting a solution of NaCNS in n-butylamine countercurrently with an aqueous solution of KOH and separating and recovering a solution of KCNS in n-butylamine and an aqueous solution of NaOH.

2. A method of converting $NaBH_4$ into $Ba(BH_4)_2$ which comprises contacting a solution of $NaBH_4$ in triethylamine countercurrently with an aqueous solution of $BaBr_2$ and separating and recovering a solution of $Ba(BH_4)_2$ in triethylamine and an aqueous solution of NaBr.

3. A method of converting $Na_2CO_3$ into $K_2CO_3$ which comprises contacting a solution of KCl in n-butylamine countercurrently with an aqueous solution of $Na_2CO_3$ and separating and recovering a solution of NaCl in n-butylamine and an aqueous solution of $K_2CO_3$.

4. A method of converting NaOH into KOH which comprises contacting a solution of KCl in n-butylamine countercurrently with an aqueous solution of NaOH and separating and recovering a solution of NaCl in n-butylamine and an aqueous solution of KOH.

References Cited in the file of this patent
UNITED STATES PATENTS

| | | |
|---|---|---|
| 2,741,540 | Bragdon et al. | Apr. 10, 1956 |
| 2,798,796 | Crewson et al. | July 9, 1957 |

OTHER REFERENCES

Huffman et al.: "Journal of the American Chemical Society," vol. 71, pp. 3179–3182 (1949).

Handbook of Chemistry and Physics, Chemical Rubber Publishing Co., Cleveland, Ohio, 33rd ed., 1951–1952, page 786.